Figure 1:
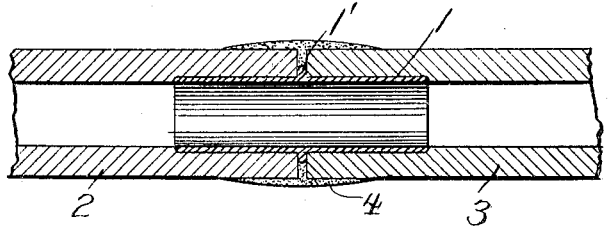

No. 769,869. PATENTED SEPT. 13, 1904.
T. B. MILLER.
CONNECTING LEAD PIPES.
APPLICATION FILED MAR. 21, 1903.
NO MODEL.

Witnesses:
M. Hunter
H. J. Lewis

Inventor:
T. B. Miller
By O. D. Lewis
Attorney.

No. 769,869.   Patented September 13, 1904.

UNITED STATES PATENT OFFICE.

THOMAS B. MILLER, OF McKEESPORT, PENNSYLVANIA.

CONNECTING LEAD PIPES.

SPECIFICATION forming part of Letters Patent No. 769,869, dated September 13, 1904.

Application filed March 21, 1903. Serial No. 148,908. (No model.)

*To all whom it may concern:*

Be it known that I, THOMAS B. MILLER, a citizen of the United States, residing at McKeesport, in the county of Allegheny and State of Pennsylvania, have invented a new and useful Improvement in Connecting Lead Pipes, of which improvement the following is a specification.

This invention relates to certain new and useful improvements in connecting lead pipes, and relates more particularly to connecting said pipes where the same have become abrased through impact or wear.

The object of this invention is when a pipe has become so worn that a repair has become necessary or in putting in new work where a connection is desired to provide cheap and efficient means to accomplish the connection of the same, which may be used by a novice without the assistance of a skilled mechanic.

My invention will be hereinafter fully described and then especially pointed out in the claim, and in describing the invention in detail reference is had to the accompanying drawings, forming a part of this specification, in which like reference characters indicate like parts throughout both views, in which—

Figure 2:
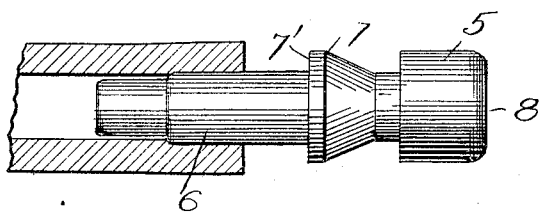

Figure 1 is a sectional view of my improved joint; and Fig. 2 is a view of the pipe-distender, which enlarges the interior of the pipe to permit my device to be used without reducing the interior area at the joint.

Heretofore it has been customary to distend one part of the pipe to form a female part and contract the other part to form a male part in connecting two ends of a lead pipe, thereby either reducing the interior area of the pipe or forming an imperfect joint, and it was also necessary to have a skilled mechanic to do the same.

My invention consists in placing a metallic thimble 1 within the ends of the pipes 2 3 in such a manner that said thimble 1 forms a perfect joint, and the lead or solder 4 which is usually employed to form said connection is in my invention only used to hold the ends of said pipes 2 3 in a fixed relation to each other. The thimble 1 has an annular ring 1', against which abuts the contiguous ends of the pipes 2 3, and when the solder or lead filling is placed in position it will engage the ring, and thus produce a perfect joint. For the purpose of retaining the full inside area of the pipe at said joint I provide a distending-tail 5, which has a part 6 of a diameter equal to the inside area of the pipe plus the thickness of the two walls of the thimble 1. The front edge of this part 6 is tapered or rounded, and at its rear it carries the enlarged portion 7, which limits its entrance into said pipe, and a head 8 is provided to receive the blow from a hammer to drive the part 6 into the pipe until the shoulder 7' contacts with the end of the pipe.

The part 6 is of a little less than one-half the length of the connecting-thimble 1, and when said part 6 has been forced in the adjacent ends of the pipes to be connected the thimble is inserted and the adjacent ends of the pipes will abut the ring 1', this being due to the fact that the distender 6 is of less length than the portions of said thimble lying on opposite sides of the ring. The lead or solder is then wiped around the connection in the usual manner, except a less quantity is used, due to the fact that said solder is only a holding means for said pipes, the real joint being formed by said thimble.

It will be noted that various slight changes may be made in my invention without departing from the general spirit thereof.

Having fully described my invention, what I desire to claim and secure by Letters Patent is—

In combination with a pair of pipes having the bores of their contiguous portions enlarged, a thimble arranged in the enlarged portions of the bores and having a bore of equal diameter to that of the pipes, an integral ring carried on the exterior of said thimble, said ring projecting between the adjacent ends of said pipes and lying within the bounds thereof, and a soft-metal filling projected inwardly into the space between the said pipe ends and into engagement with said ring, and flowed over the outer surfaces of the contiguous end portions of said pipes.

In testimony whereof I have hereunto signed my name in the presence of two subscribing witnesses.

THOMAS B. MILLER.

In presence of—
ALICE E. DUFF,
H. J. LEVIS.